US012747852B1

(12) United States Patent
Nie

(10) Patent No.: US 12,747,852 B1
(45) Date of Patent: Sep. 29, 2026

(54) BANKER'S LAMP WITH BRACKET AND CONNECTOR ARRANGED ON BRACKET TO CONNECT WITH A LAMPSHADE

(71) Applicant: Chuanxiang Nie, Suizhou (CN)

(72) Inventor: Chuanxiang Nie, Suizhou (CN)

( * ) Notice: Subject to any disclaimer, the term of this patent is extended or adjusted under 35 U.S.C. 154(b) by 0 days.

(21) Appl. No.: 19/435,852

(22) Filed: Dec. 30, 2025

(30) Foreign Application Priority Data

Nov. 5, 2025 (CN) ......................... 202522343873.9

(51) Int. Cl.
*F21V 17/00* (2006.01)
*F21S 6/00* (2006.01)
*F21V 17/12* (2006.01)

(52) U.S. Cl.
CPC ............ *F21V 17/002* (2013.01); *F21S 6/002* (2013.01); *F21V 17/12* (2013.01)

(58) Field of Classification Search
CPC ........... F21S 6/002; F21S 6/003; F21V 17/12; F21V 17/002
USPC ......... 362/351, 361, 311.01, 311.02, 311.03, 362/311.04, 311.05, 311.06, 311.07, 362/311.08, 311.09, 311.1, 311.11, 362/311.12, 311.13, 311.14, 311.15
See application file for complete search history.

(56) References Cited

U.S. PATENT DOCUMENTS 1,389,013 A * 8/1921 Schwartz ................ F21S 6/003 362/427
5,825,637 A * 10/1998 Chen ..................... F21V 7/0008 362/453

* cited by examiner

*Primary Examiner* — Robert J May

(57) ABSTRACT

A banker's lamp includes a base, a bracket, a light-emitting member, a lampshade, and a first fastener. The bracket includes a bracket body and a first connector arranged on the bracket body. The bracket body is connected to the base, and the first connector is arranged on a side of the bracket body away from the base. The light-emitting member is mounted to the first connector. The lampshade is arranged to surround the light-emitting member. The first connector at least partially penetrates the lampshade. The first fastener is connected to the first connector from an outside of the lampshade to fix the lampshade to the bracket.

13 Claims, 5 Drawing Sheets

BANKER'S LAMP WITH BRACKET AND CONNECTOR ARRANGED ON BRACKET TO CONNECT WITH A LAMPSHADE

CROSS REFERENCE TO RELATED APPLICATIONS

This application claims priority of the Chinese patent application No. 202522343873.9, filed on Nov. 5, 2025, the disclosure of which is hereby incorporated by reference in its entirety.

FIELD OF THE DISCLOSURE

The present disclosure relates to the technical field of lighting equipment, in particular to a banker's lamp.

BACKGROUND

Existing banker's lamps typically adopt a structure with a lampshade and external bilateral brackets. Mounting or replacing the lampshade requires a use of tools to dismantle a lamp head and electrical connections, which is complex to operate and prone to damaging the lampshade or wires, posing safety hazards. When the lampshade is damaged or users wish to replace the lampshade with one of a different color, professional personnel are often required, which takes a long time, making it unfavorable for maintenance and personalized use.

SUMMARY

The following presents a simplified summary of the disclosure in order to provide a basic understanding of some aspects of the disclosure. This summary is not an extensive overview of the disclosure. It is not intended to identify critical elements or to delineate the scope of the disclosure. Its sole purpose is to present some concepts of the disclosure in a simplified form as a prelude to the more detailed description that is presented elsewhere.

In some embodiments, a banker's lamp is provided. The banker's lamp includes a base, a bracket, a light-emitting member, a lampshade, and a first fastener. The bracket includes a bracket body and a first connector arranged on the bracket body. The bracket body is connected to the base, and the first connector is arranged on a side of the bracket body away from the base. The light-emitting member is mounted to the first connector. The lampshade is arranged to surround the light-emitting member. The first connector at least partially penetrates the lampshade. The first fastener is connected to the first connector from an outside of the lampshade to fix the lampshade to the bracket.

BRIEF DESCRIPTION OF THE DRAWINGS

Illustrative embodiments of the present disclosure are described in detail below with reference to the attached drawing figures.

NUMERAL REFERENCES IN THE DRAWINGS

Figure 1:
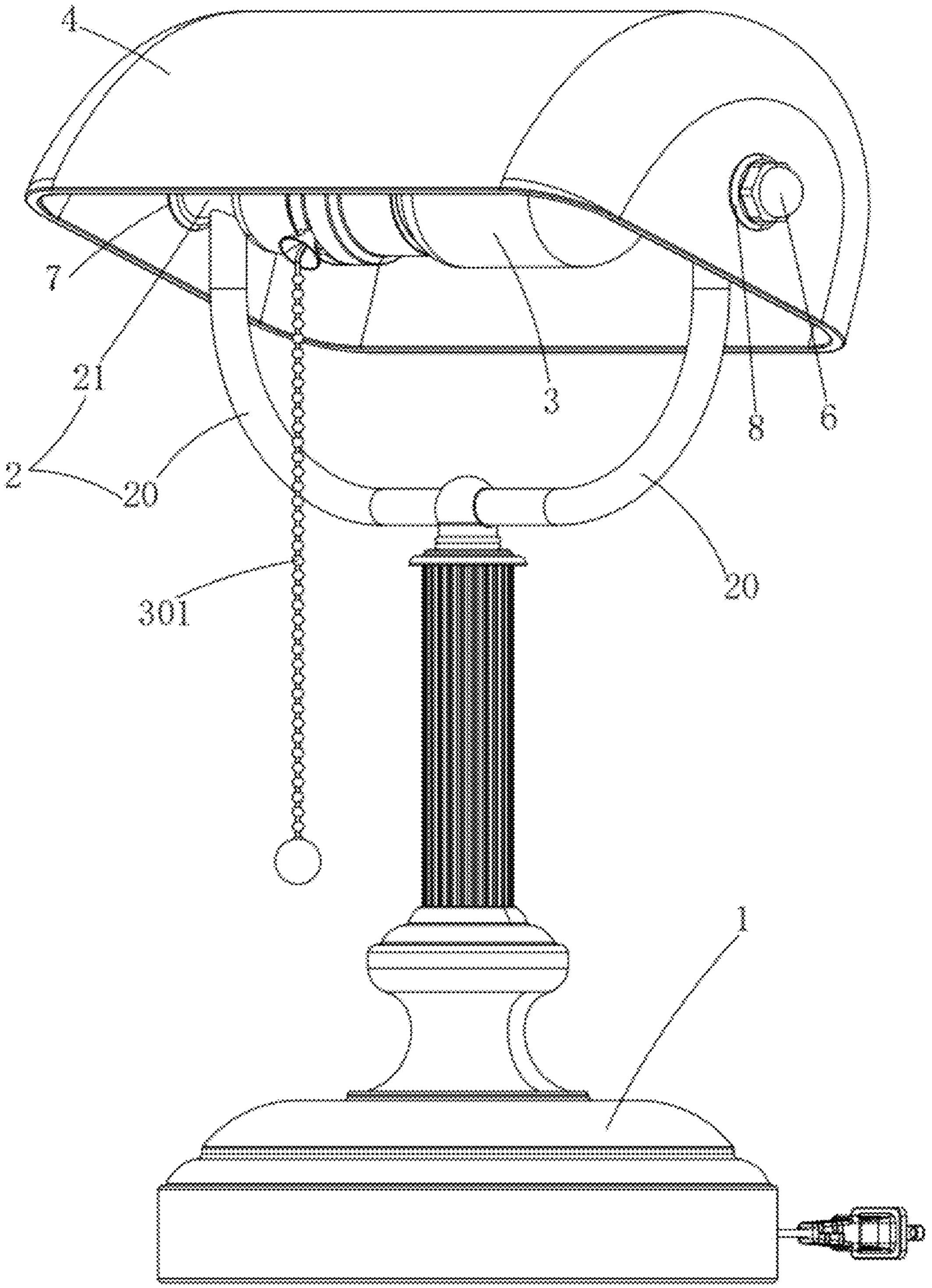
FIG. 1 is a structural view of a banker's lamp according to some embodiments of the present disclosure.

1—base;

2—bracket; 20—bracket body; 200—wiring channel; 2000—first wiring hole; 21—first connector; 210—first connection body; 2100—first connection hole; 211—first connection portion; 2110—first connection stud; 212—second connection portion; 2120—second connection stud; 2121—second wiring hole; 22—second connector; 220—second connection body; 2200—second connection hole; 221—third connection portion; 2210—third connection stud;

3—light-emitting member; 30—lamp holder; 300—connection threaded hole; 301—pull-cord switch; 31—light bulb; 32—wire;

4—lampshade; 401—first mounting hole; 402—second mounting hole;

5—first fastener; 50—first fastening nut;

6—second fastener; 60—second fastening nut;

7—first washer; 70—washer body; 71—washer shell;

8—second washer;

9—partition member;

D1—width dimension of the first connection body; D2—width dimension of the first fastener; D3—diameter of the first mounting hole;

D4—width dimension of the second connection body; D5—width dimension of the second fastener; D6—diameter of the second mounting hole;

D7—maximum spacing between the first connection body and the second connection body; D8—internal length of the lampshade.

DETAILED DESCRIPTION

The following describes some non-limiting exemplary embodiments of the disclosure with reference to the accompanying drawings. The described embodiments are merely a part rather than all of the embodiments of the disclosure. All other embodiments obtained by a person of ordinary skill in the art based on the embodiments of the disclosure shall fall within the scope of the disclosure.

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

Referring to FIGS. 1-5, the disclosure provides a banker's lamp. The banker's lamp may include a base 1, a bracket 2, a light-emitting member 3, a lampshade 4, and a first fastener 5. The bracket 2 may include a bracket body 20 and a first connector 21 arranged on the bracket body 20. The bracket body 20 may be connected to the base 1, and the first connector 21 may be arranged on a first distal end of the bracket body 20 away from the base 1. The light-emitting member 3 may be mounted on the first connector 21. The lampshade 4 may be arranged to surround the light-emitting member 3, and the first connector 21 may at least partially penetrate the lampshade 4. The first fastener 5 may be connected to the first connector 21 from an outside of the lampshade 4 to fix the lampshade 4 to the bracket 2.

Specifically, the base 1 may serve as an overall support structure of the banker's lamp, and modules such as a power supply and a control board may be arranged inside the base 1 to provide power and control for the light-emitting member 3. The bracket body 20 may extend upward from the base 1 to provide support for the light-emitting member 3 and the lampshade 4. The lampshade 4 may be made of a glass material. By surrounding the light-emitting member 3, light emitted from the light-emitting member 3 may pass through and be reflected by the lampshade 4 to form a unique lighting effect and focusing effect. In other embodiments, the lampshade 4 may also be made of PVC, marble, or other materials. The first connector 21 may serve as a transitional member between the lampshade 4 and the bracket body 20, being used both for mounting the light-emitting member 3 and providing a support and fixation point for the lampshade 4. The first connector 21 may extend from an inside of the lampshade 4 to the outside of the lampshade 4, thereby forming a mounting structure that may penetrate the lampshade 4 from the inside to the outside. A through hole or slot may be formed on the lampshade 4 for the first connector 21 to pass through, enabling the first connector 21 to extend to an outer wall of the lampshade 4. The first fastener 5 may then be engaged with an end of the first connector 21 from the outside of the lampshade 4 via screw or snap-fit connection. This arrangement may allow a clamping force for fixing the lampshade 4 to be concentrated between an inner wall of the lampshade 4 and an outer wall of the lampshade 4, each of which may be located at a respective one of two opposite ends of the first connector 21, ensuring an assembly strength while avoiding radial squeezing or local stress concentration on a main body of the lampshade 4, thereby reducing a risk of breakage for a glass lampshade 4. Furthermore, since the first fastener 5 is located on the outside of the lampshade 4, users may only need to rotate or manipulate the first fastener 5 to complete the mounting or removal of the lampshade 4, without dismantling the light-emitting member 3 or using tools at inside the lampshade 4, greatly improving maintenance convenience.

In summary, by arranging a connection point between the first connector 21 and the bracket body 20 on an inner side of the lampshade 4, and allowing the first connector 21 partially extend outward through the lampshade 4 to cooperate with the first fastener 5 located on the outside of the lampshade 4, a stable fixation of the lampshade 4 may be achieved. The arrangement of the first fastener 5 on the outer side of the lampshade 4 may allow users to mount or replace the lampshade 4 simply by rotating or attaching/detaching the first fastener 5 from the outside of the lampshade 4, without removing the light-emitting member 3 or using special tools, significantly improving assembly efficiency and safety. Thus, not only structural stability and assembly convenience of the banker's lamp may be enhanced, but also a risk of damage caused by an excessive force or collision during lampshade replacement may be effectively reduced, thereby extending a service life of the banker's lamp and improving user experience.

Figure 2:
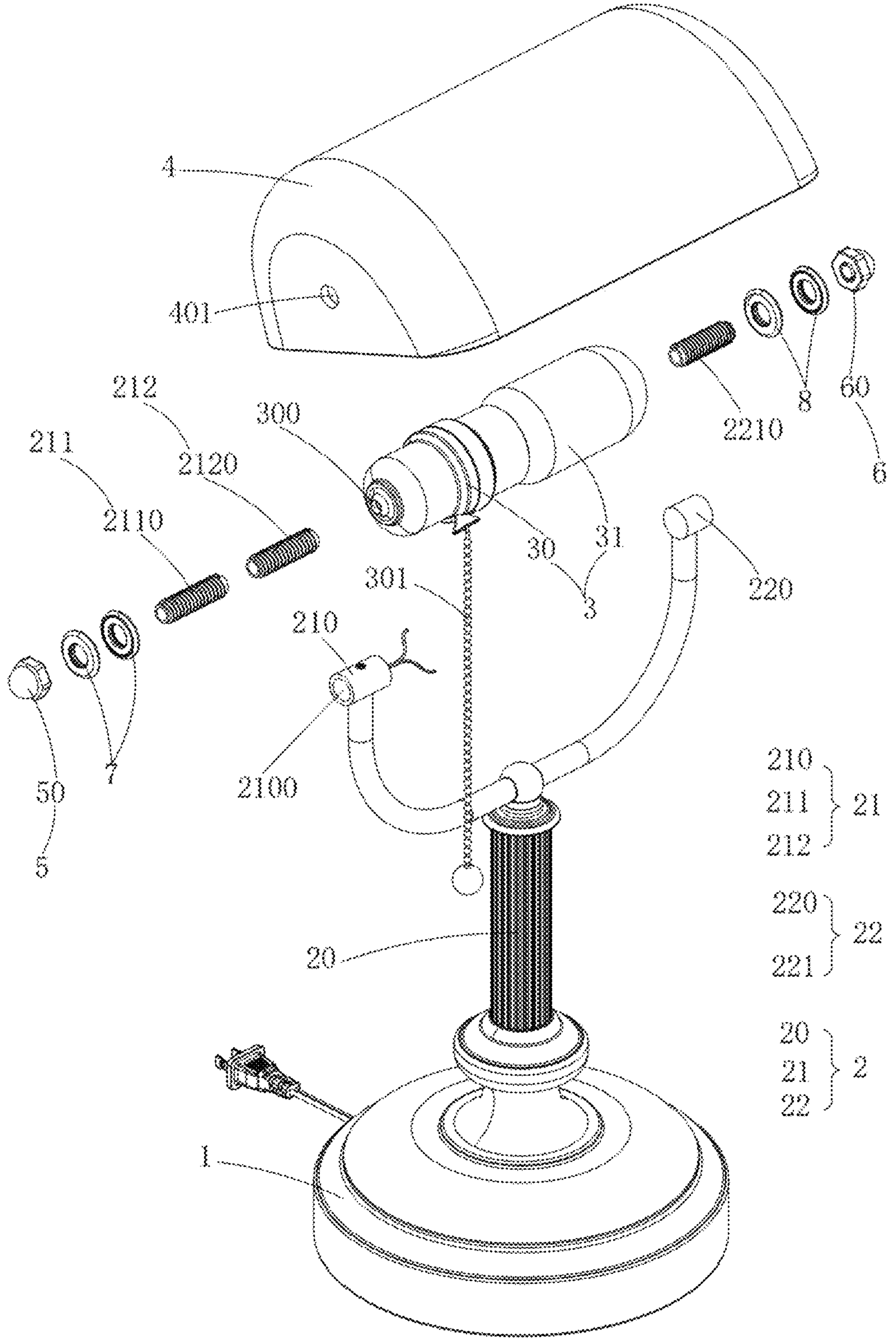
FIG. 2 is an exploded view of the banker's lamp according to some embodiments of the present disclosure.
Figure 3:
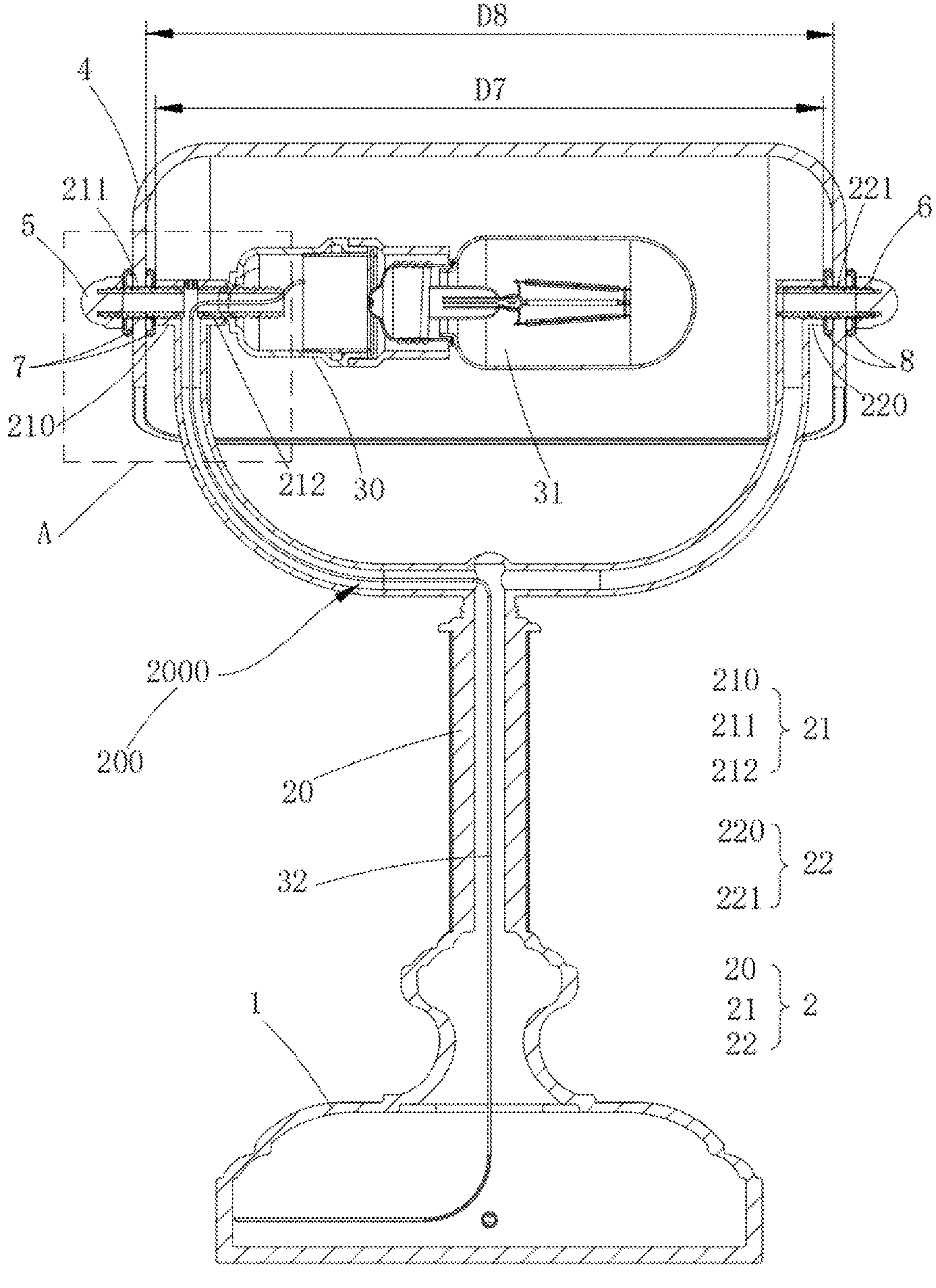
FIG. 3 is a first cross-sectional view of the banker's lamp according to some embodiments of the present disclosure.
Figure 4:
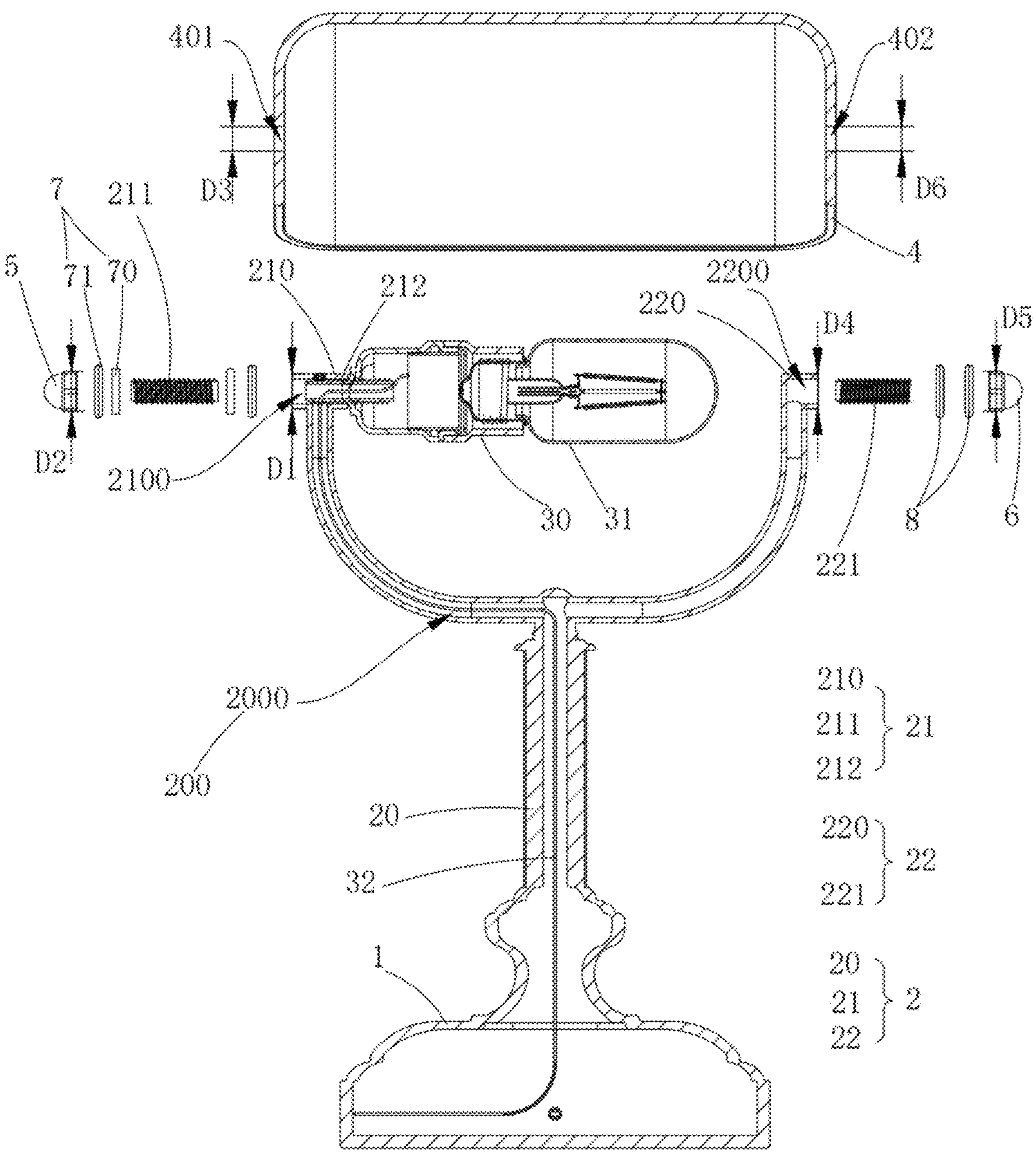
FIG. 4 is a second cross-sectional view of the banker's lamp according to some embodiments of the present disclosure.

Referring to FIGS. 2-4, in some embodiments, the first connector 21 may include a first connection body 210, a first connection portion 211, and a second connection portion 212. The first connection portion 211 and the second connection portion 212 may be arranged on the first connection body 210. The lampshade 4 may define a first mounting hole 401. The first connection portion 211 may at least partially penetrate the first mounting hole 401 and may be connected to the first fastener 5. Each of a width dimension D1 of the first connection body 210 and a width dimension D2 of the first fastener 5 may be greater than a diameter D3 of the first mounting hole 401. The light-emitting member 3 may be mounted to the second connection portion 212. Specifically, the first connection body 210 may be integrally formed with the bracket body 20 as a one-piece structure. The first connection body 210 may be roughly of a tubular structure. Each of the first connection portion 211 and the second connection portion 212 may be arranged at a respective one of two ends of the first connection body 210 and may be coaxial with the first connection body 210. The first connection portion 211 may penetrate the first mounting hole 401 of the lampshade 4 and extend to the outside of the lampshade 4. The second connection portion 212 may provide a mounting base for the light-emitting member 3. Since each of the width dimension D1 of the first connection body 210 and the width dimension D2 of the first fastener 5 is greater than the diameter D3 of the first mounting hole 401, the first fastener 5, after being connected to the first connection portion 211, may cooperate with the first connection body 210 to form a clamping fixation for the lampshade 4, and the first connection portion 21 may provide a support for the lampshade 4. Specifically, the width dimension may refer to an outer diameter, a width, or a height of the first connection body 210 or the first fastener 5. As shown in FIG. 2, each of the first connection body 210 and the first fastener 5 may be of a cylindrical structure. Therefore, the width dimension here may refer to an outer diameter of the first connection body 210 or the outer diameter of the first fastener 5.

As shown in FIG. 2, in some embodiments, the first connection portion 211 may be a first connection stud 2110. The first connection body 210 may define a first connection hole 2100. The first fastener 5 may include a first fastening nut 50 matched with the first connection stud 2110. One end of the first connection stud 2110 may be connected to the first connection body 210 via the first connection hole 2100, and the other end of the first connection stud 2110 may pass through the first mounting hole 401 and may be connected to the first fastening nut 50. Specifically, the first connection hole 2100 may penetrate through both ends of the first connection body 210 and may be a threaded hole. The one end of the first connection stud 2110 may be threadedly connected with the first connection body 210, and the other end of the first connection stud 2110 may pass through the first mounting hole 401 and extend to the outside of the lampshade 4. In this case, the first fastener 5 may be the first fastening nut 50. Rotating the first fastening nut 50 may enable the first fastening nut 50 to be threadedly connected with the first connection stud 2110. Continuously tightening the first fastening nut 50 may cause the first fastening nut 50 and an end wall of the first connection body 210 to cooperatively form a clamping fixation on the lampshade 4. The arrangement of the first fastening nut 50 may facilitate users to mounting or removing the lampshade 4 using a wrench from the outside of the lampshade 4. The detachable arrangement of the first connection body 210, the first connection stud 2110, and the first fastening nut 50 may enable the lampshade 4 to be mounted in the following steps: first, the first connection stud 2110 may be passed through the first mounting hole 401 from the outside of the lampshade 4; then, the first connection stud 2110 may be threadedly connected to the first connection body 210 via the first connection hole 2100 to provide an initial support for the lampshade 4; finally, the first fastening nut 50 may be fastened to secure the lampshade 4 through clamping fixation.

Referring to FIGS. 2-4, in some embodiments, the banker's lamp may further include at least two first washers 7. Each of the at least two first washers 7 may sleeve the first connection portion 211. One of the first washers 7 may be located between the first fastener 5 and the outer wall of the lampshade 4, and another of the first washers 7 may be located between the first connection body 210 and the inner wall of the lampshade 4. Specifically, the first washers 7 may be made of a soft rubber material. The arrangement of the first washers 7, may not only increase contact areas with the lampshade 4 during tightening, improving firmness of the clamping to the lampshade 4, it may also prevent the first fastener 5 and the first connection body 210 from applying a rigid pressure on the glass lampshade 4, effectively reducing breakage at a connection point of the lampshade 4 and the bracket 2.

Figure 5:
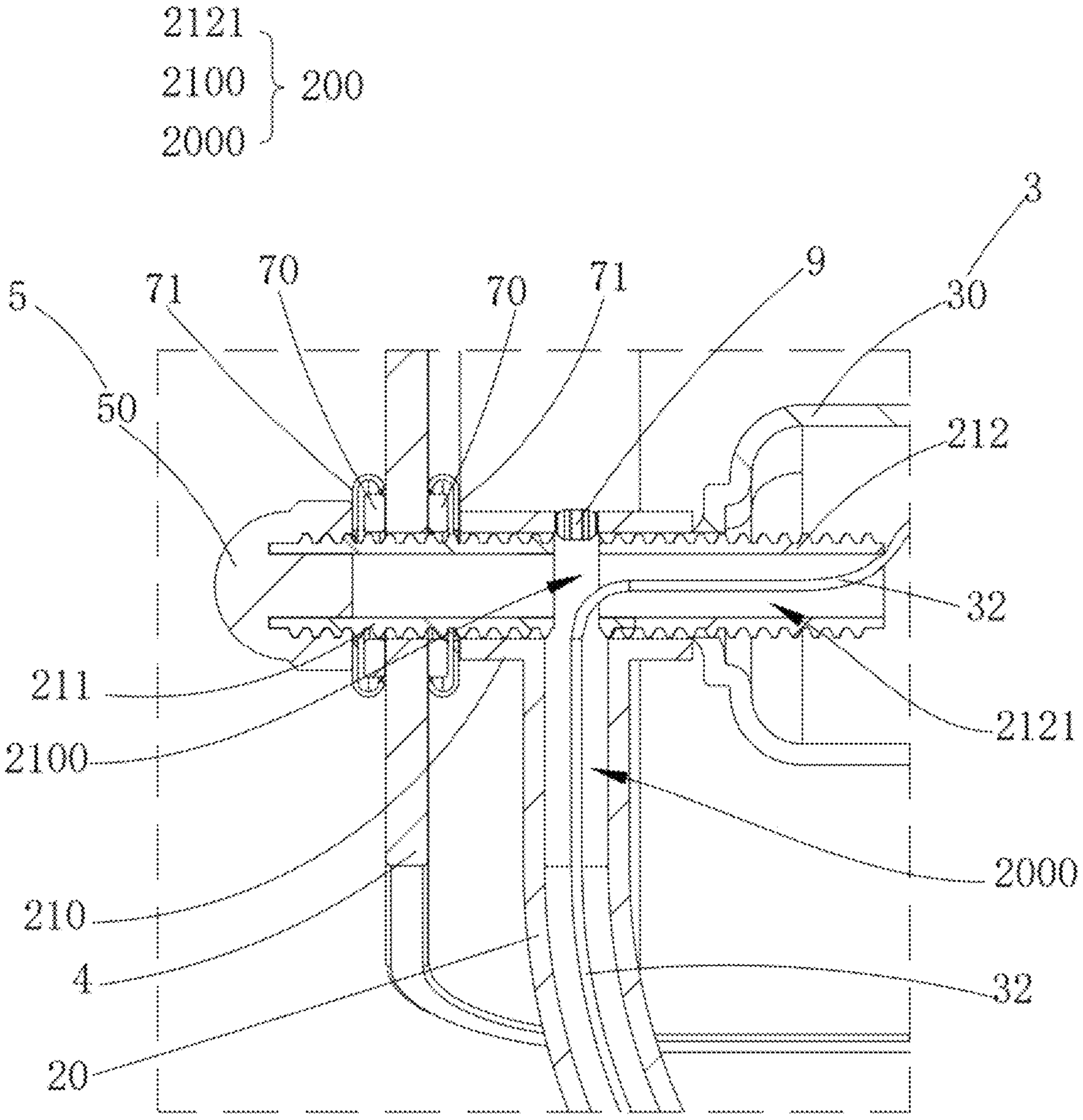
FIG. 5 is an enlarged view of a portion A in FIG. 3.

Referring to FIGS. 3, 4, and 5, in some embodiments, each first washer 7 may include a washer body 70 and a washer shell 71. The washer shell 71 may wrap an outer side of the washer body 70. An outer wall of the washer shell 71 may be contacted with the first fastener 5 or the first connection body 210, and an inner side of the washer body 70 may fit against the lampshade 4. Specifically, the washer body 70 may be made of rubber. The rubber washer body 70 may be used to fit and contact the glass lampshade 4, increasing friction between the rubber washer body 70 and the glass lampshade 4 while avoiding rigid pressure. The washer shell 71 may be made of metal, allowing the washer shell 71 to be coated with a metal plating to achieve a color consistent with the first fastener 5 or the bracket 2. Since the washer body 70 is covered by the washer shell 71, an appearance color of the banker's lamp may be more unified and an overall look may be more aesthetically pleasing.

Referring to FIGS. 2-5, in some embodiments, the light-emitting member 3 may include a lamp holder 30 and a light bulb 31. The second connection portion 212 may include a second connection stud 2120. The lamp holder 30 may define a connection threaded hole 300 matched with the second connection stud 2120. The light bulb 31 may be detachably mounted on the lamp holder 30. Specifically, one end of the second connection stud 2120 may be threadedly connected to the first connection body 210 via the first connection hole 2100, and the other end of the second connection stud 2120 may be threadedly connected to the lamp holder 30 via the connection threaded hole 300, thereby mounting and fixing the lamp holder 30 to the first connector 21. After assembly, the lamp holder 30 may extend away from the first connection portion 211, avoiding an interference between the lamp holder 30 and a connection of the lampshade 4 and the first connection portion 211, thereby allowing the lamp holder 30 and light bulb 31 to remain in place during lampshade replacement, eliminating a need for disassembly of the lamp holder 30 and light bulb 31. In this way, disassembly steps during lampshade replacement may be reduced, thereby improving maintenance efficiency of the banker's lamp. The light bulb 31 may be mounted on the lamp holder 30 via threads or snaps and may be electrically connected to the lamp holder 30. Additionally, the lamp holder 30 may be arranged with a pull-cord switch 301 extending outward to control turning the light bulb 31 on and off. An arrangement of the pull-cord switch 301 may also make the banker's lamp more classic and aesthetically pleasing.

To enable the lamp holder 30 to receive power without affecting the appearance of the banker's lamp, in some embodiments, a wiring channel 200 may be formed in the bracket 2. The wiring channel 200 may be at least distributed in the bracket body 20, the first connection body 210, and the second connection portion 212, and the wiring channel 200 may be communicated with the light-emitting member 3 and the base 1. A power supply or a control board may also be mounted in the base 1. The light-emitting member 3 may further include a wire 32 connected to the lamp holder 30. After passing through the wiring channel 200, the wire 32 may be electrically connected to the power supply or control board in the base 1, thereby providing power to the lamp holder 30. The internal wiring manner may ensure no exposed wires on the banker's lamp, effectively improving the appearance of the banker's lamp. Moreover, since the wiring channel 200 does not interfere with the first connection portion 211, the lampshade 4 and the first connection portion 211 may be mounted or removed without disconnecting the wires from the lamp holder 30. This may ensure that the mounting and removal of the lampshade 4 may remain unaffected by the lamp holder 30 or the wire 32.

Referring to FIGS. 3 and 5, in some embodiments, a first wiring hole 2000 may be formed in the bracket body 20. The first connection body 210 may define a first connection hole 2100 penetrating through both ends of the first connection body 210, and the first connection hole 2100 may be communicated with the first wiring hole 2000. The second connection portion 212 may define a second wiring hole 2121.

The first connection portion 211 may be detachably connected to the first connection body 210 and arranged in the first connection hole 2100 and at least partially extend out of the first connection hole 2100. The second connection portion 212 may be detachably connected to the first connection body 210 and arranged in the first connection hole 2100 and at least partially extend out of the first connection hole 2100. The first connection portion 211 and the second connection portion 212 may be spaced apart from each other in the first connection hole 2100, so that the first wiring hole 2000, the first connection hole 2100, and the second wiring hole 2121 may be communicated with each other to form the wiring channel 200.

Specifically, the bracket body 20 may have a hollow interior arrangement forming the first wiring hole 2000. The first connection body 210 may have the first connection hole 2100 penetrating through both ends, which may be communicated to the first wiring hole 2000 of the bracket body 20. The second wiring hole 2121 may axially penetrate the second connection portion 212. Both the first connection portion 211 and the second connection portion 212 may be coaxially mounted to the first connection body 210 through the first connection hole 2100 via a threaded connection. The first connection portion 211 and the second connection portion 212 may be spaced apart from each other in the first connection hole 2100, and a spaced position between the first connection portion 211 and the second connection portion 212 may align with an end of the first wiring hole 2000. That is, both the first connection portion 211 and the second connection portion 212 may extend to the end of the first wiring hole 2000, thereby allowing the first wiring hole 2000 and the second wiring hole 2121 to be communicated with the first connection hole 2100 via the spaced position. This allows the wire 32, after passing through the second wiring hole 2121, to smoothly pass through the first connection hole 2100 into the first wiring hole 2000, and finally into an interior of the base 1.

Referring to FIGS. 3 and 5, in some embodiments, the banker's lamp may further include at least one partition member 9. The at least one partition member 9 may be detachably mounted to the first connection body 210. The at least one partition member 9 may partially extend to the first connection hole 2100 along a radial direction of the first connection body 210. The at least one partition member 9 may be located between the first connection portion 211 and the second connection portion 212. Specifically, the partition member 9 may be a grub screw. A threaded hole may be formed on an outer wall of the first connection body 210, and the threaded hole may extend along the radial direction of the first connection body 210. The threaded hole may face a connection position between the first connection body 210 and the bracket body 20 in axial direction of the first connection body 210. The partition member 9 may be threadedly connected to the first connection body 210 via the threaded hole, with an end of the partition member 9 extending to the first connection hole 2100. A distance that the end of the partition member 9 extends into the first connection hole 2100 may be ensured to be much smaller than a diameter of the first connection hole 2100, preventing a portion of the partition member 9 in the first connection hole 2100 from pressing on the wire 32 in the wiring channel 200. Furthermore, since the partition member 9 is a grub screw, when assembled to the first connection body 210, the partition member 9 may not protrude from the outer wall of the first connection body 210, resulting in no obvious protrusions on the outer wall of the first connection body 210 and a more aesthetically pleasing appearance of the banker's lamp. Since a portion of the partition member 9 is arranged in the first connection hole 2100, both the first connection portion 211 and the second connection portion 212 may be blocked by the partition member 9 and may not move closer to each other, thereby preventing the first connection portion 211 from pressing on the wire 32. Depending on a thickness of the wire 32, two or more partition members 9 may be arranged side by side along the axial direction of the first connection body 210 to further increase a spacing between the first connection portion 211 and the second connection portion 212, allowing the wire 32 to pass through the wiring channel 200 without being pressed by the first connection portion 211. In other embodiments, a partition member 9 with a larger outer diameter may also be arranged to increase the spacing between the first connection portion 211 and the second connection portion 212.

To further enhance a stable support effect of the bracket 2 on the lampshade 4, referring to FIGS. 2 to 4, in some embodiments, the bracket 2 may further include a second connector 22 arranged on a second distal end of the bracket body 20. The bracket body 20 has a symetrical structure which may include a straight rod and a U-shaped or and arc-shaped connecting portion. The first connector 21 and the second connector 22 are positioned at opposite ends of the connecting portion. The second connector 22 may be spaced apart from the first connector 21. The second connector 22 may be detachably connected to the lampshade 4. Specifically, the bracket body 20 may be roughly Y-shaped. One branch of the bracket body 20 may be connected to the first connector 21, and the other branch of the bracket body 20 may be connected to the second connector 22. A spacing direction between the first connector 21 and the second connector 22 may correspond to a length direction of the lampshade 4. The first connector 21 and second connector 22 which may be spaced apart from each other may provide a support on both sides of the lampshade 4 along the length direction of the lampshade 4, improving firmness of the lampshade 4 on the bracket 2.

Referring to FIGS. 2-4, the second connector 22 may at least partially penetrate the lampshade 4. The banker's lamp further may include a second fastener 6. The second fastener 6 may be connected to the second connector 22 from the outside of the lampshade 4. Specifically, the second connector 22 may include a second connection body 220 and a third connection portion 221 arranged on the second connection body 220. The second connection body 220 may be integrally formed with the bracket body 20 as a one-piece structure. A maximum spacing D7 between the second connection body 220 and the first connection body 210 may be less than an internal length D8 of the lampshade 4, ensuring that both the first connection body 210 and the second connection body 220 may be arranged in the lampshade 4, improving an overall aesthetics of the lamp. The third connection portion 221 may be detachably connected to the lampshade 4. Specifically, the second connection body 220 may define a second connection hole 2200, which may be a threaded hole. The third connection portion 221 may be specifically a third connection stud 2210. The second fastener 6 may be a second fastening nut 60. Correspondingly, the lampshade 4 may define a second mounting hole 402 coaxial with the first mounting hole 401. The second mounting hole 402 and the first mounting hole 401 may be arranged to face each other, and each of the second mounting hole 402 and the first mounting hole 401 may be formed on a respective one of two opposite side walls of the lampshade 4. Each of a width dimension D4 of the second connection body 220 and a width dimension D5 of the second fastener 6 may be greater than a diameter D6 of the second mounting hole 402. Based on this, one end of the third connection stud 2210 may pass through the second mounting hole 402 and may be threadedly connected to the second connection body 220 via the second connection hole 2200, allowing the third connection stud 2210 to initially support the lampshade 4. Finally, by tightening the second fastening nut 60 to the third connection stud 2210, the lampshade 4 may be clamped and fixed.

Similarly, the banker's lamp may further include two second washers 8. The second washers 8 may sleeve the third connection stud 2210, and each of the two second washers 8 may fit against a respective one of the inner wall and outer wall of the lampshade 4. The second washers 8 may have a same configuration as the first washers 7. That is, each second washer 8 may also include a washer body made of rubber and a washer shell made of metal. The washer body of the second washer 8 may be contacted with the lampshade 4, thereby improving a connection stability of the second connector 22 and second fastener 6 to the lampshade 4 and reducing a probability of breakage at a connection point of the lampshade 4 and the bracket 2. The washer shell of the second washer 8 may be coated via metal plating to achieve a matching color, making color of an entirety of the banker's lamp harmonious and making the banker's lamp more aesthetically pleasing.

In other embodiments, the second fastener 6 may also be connected to the second connector 22 from the inside of the lampshade 4. Specifically, the second connection body 220 may be placed on the outer side of the lampshade 4, and one end of the third connection stud 2210 may extend from the inside of the lampshade 4 through the second mounting hole 402 and may then be threadedly connected to the second connection body 220 via the second connection hole 2200. Finally, the second fastening nut 60 may be connected to the third connection stud 2210 from the inner side of the lampshade 4 and tightened.

As shown in FIG. 3, in some embodiments, the light-emitting member 3 may be arranged between the first connector 21 and the second connector 22 and may be spaced apart from the second connector 22. This arrangement may allow one end of the light-emitting member 3 to be connected to the first connector 21 and the other end of the light-emitting member 3 to be suspended in the lampshade 4, making the overall banker's lamp more aesthetically pleasing. A spaced arrangement between the light-emitting member 3 and the second connector 22 may also provide a space for replacing the light bulb 31, preventing the light bulb 31 from colliding with the second connector 22 during replacement.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A banker's lamp, comprising:

a base;

a bracket, comprising a bracket body and a first connector arranged on the bracket body, wherein the bracket body is connected to the base, and the first connector is arranged on a first end of the bracket body away from the base;

a light-emitting member, mounted to the first connector;

a lampshade, arranged to surround the light-emitting member, wherein the first connector at least partially penetrates the lampshade; and a first fastener, connected to the first connector from an outside of the lampshade to fix the lampshade to the bracket;

wherein the first connector comprises a first connection body, a first connection portion, and a second connection portion, and each of the first connection portion and the second connection portion is arranged on the first connection body; the lampshade defines a first mounting hole, the first connection portion at least partially penetrates the first mounting hole and is connected to the first fastener, and each of a width dimension of the first connection body and a width dimension of the first fastener is greater than a diameter of the first mounting hole; the light-emitting member is mounted to the second connection portion.

2. The banker's lamp according to claim 1, wherein the first connection portion is a first connection stud, the first connection body defines a first connection hole; the first fastener comprises a first fastening nut matched with the first connection stud; one end of the first connection stud is connected to the first connection body via the first connection hole, and the other end of the first connection stud passes out of the first mounting hole and is connected to the first fastening nut.

3. The banker's lamp according to claim 1, further comprising at least two first washers, wherein each of the at least two first washers sleeves the first connection portion, one of the at least two first washers is arranged between the first fastener and an outer wall of the lampshade, and another of the at least two first washers is arranged between the first connection body and an inner wall of the lampshade.

4. The banker's lamp according to claim 3, wherein each of the at least two first washers comprises a washer body and a washer shell, the washer shell wraps an outer side of the washer body, an outer wall of the washer shell contacts the first fastener or the first connection body, and an inner side of the washer body fits against the lampshade.

5. The banker's lamp according to claim 1, wherein a wiring channel is formed in the bracket, the wiring channel is at least distributed in the bracket body, the first connection body, and the second connection portion, and the wiring channel is communicated with the light-emitting member and the base.

6. The banker's lamp according to claim 5, wherein a first wiring hole is formed in the bracket body, the first connection body defines a first connection hole penetrating through both ends of the first connection body, the first connection hole is communicated to the first wiring hole, and the second connection portion defines a second wiring hole;

the first connection portion is detachably connected to the first connection body via the first connection hole, and at least partially extends out of the first connection hole; the second connection portion is detachably connected to the first connection body via the first connection hole, and at least partially extends out of the first connection hole; the first connection portion and the second connection portion are spaced apart from each other in the first connection hole, enabling the first wiring hole, the first connection hole, and the second wiring hole to be communicated with each other and cooperatively form the wiring channel.

7. The banker's lamp according to claim 5, further comprising at least one partition member, wherein the at least one partition member is detachably mounted to the first connection body, the at least one partition member partially extends in the first connection hole along a radical direction of the first connection body, and the at least one partition member is arranged between the first connection portion and the second connection portion.

8. The banker's lamp according to claim 1, wherein the light-emitting member comprises a lamp holder and a light bulb, the second connection portion comprises a second connection stud, the lamp holder defines a connection threaded hole matched with the second connection stud, and the light bulb is detachably mounted to the lamp holder.

9. The banker's lamp according to claim 1, wherein the bracket further comprises a second connector arranged on a second end of the bracket body, the second connector is spaced apart from the first connector, the second connector comprises a second connection body and a third connection portion arranged on the second connection body, the third connection portion is detachably connected to the lampshade; a maximum spacing between the first connection body and the second connection body is less than an internal length of the lampshade.

10. The banker's lamp according to claim 1, wherein the bracket further comprises a second connector arranged on the bracket body, the second connector is spaced apart from the first connector, and the second connector is detachably connected to the lampshade.

11. The banker's lamp according to claim 10, wherein the second connector at least partially penetrates the lampshade; the banker's lamp further comprises a second fastener, the second fastener is connected to the second connector from the outside of the lampshade.

12. The banker's lamp according to claim 10, wherein the second connector at least partially penetrates the lampshade; the banker's lamp further comprises a second fastener, the second fastener is connected to the second connector from an inside of the lampshade.

13. The banker's lamp according to claim 10, wherein the light-emitting member is arranged between the first connector and the second connector, and is spaced apart from the second connector.

* * * * *